United States Patent Office 2,939,855
Patented June 7, 1960

2,939,855
TERPOLYMERS CONTAINING SALTS OF HALF ESTERS OF α,β UNSATURATED ETHYLENE DICARBOXYLIC ACIDS AND COMPOSITION CONTAINING SAME

Herbert Bartl, Koln-Stammheim, and Gustav Sinn, Berg. Neukirchen, Germany, assignors to Farbenfabriken Bayer Aktiengesellschaft, Leverkusen, Germany, a corporation of Germany No Drawing. Filed Jan. 18, 1956, Ser. No. 559,764

Claims priority, application Germany Jan. 24, 1955

6 Claims. (Cl. 260—29.7)

This invention relates to elastic coatings and to a process for their production.

In accordance with the invention it has been found that elastic coatings with good bonding powers can be obtained from emulsion polymers which are produced by copolymerization of (1) polymerizable ethylenically unsaturated compounds with an elasticizing action, which contain no free acid groups, (2) other polymerizable ethylenically unsaturated organic compounds, which contain no free acid groups, and (3) semi-esters or their salts of α-β-ethylene dicarboxylic acids and alcohols, which contain at least 8 carbon atoms in aliphatic or cycloaliphatic bond.

Suitable polymerizable ethylenically unsaturated organic compounds with an elasticizing action are, for example acrylic and methacrylic acid esters of alcohols with at least 4 carbon atoms, for instance butyl alcohol, dodecyl alcohol, octadecyl alcohol, vinyl alkyl ethers, the alkyl radicals of which contain at least 4 carbon atoms such as vinyl isobutyl ether and vinyl butyl ether, and compounds with conjugated double bonds, such as butadiene, its homologues and derivatives such as isoprene, 2,3-dimethyl butadiene and β-chlorobutadiene.

Examples of said polymerizable organic compounds which do no have an elasticizing action are: styrene, acrylonitrile, methacrylonitrile, acrylic or methacrylic esters of alcohols with 1–3 carbon atoms, 1,1-dichloroethylene, divinyl benzene.

Suitable semi-esters of α-β-ethylene dicarboxylic acids and alcohols with at least 8 carbon atoms in aliphatic or cycloaliphatic bond are, for example the semi-esters of maleic acid and fumaric acid with aliphatic alcohols, such as for example octyl alcohol, dodecyl alcohol and octadecyl alcohol. Alcohols which have proved to be particularly suitable are cycloaliphatic alcohols with several ring systems and alkyl side chains, such as exist for example in abietic alcohol.

It is preferable to use (1) the polymerizable unsaturated organic compounds with an elasticizing action in amounts of 30 to 94 percent by weight, (2) the other polymerizable organic compounds in amounts of 70 to 5 percent by weight and (3) the semi-esters in amounts of about 1 to 20 percent by weight, calculated on the total amount of the polymerizable compounds. It is, however, also possible to use other proportions.

The polymerization is carried out in the heterogeneous phase, preferably in aqueous medium, it having proved particularly advantageous to adjust the pH to a value higher than 7; preferably to 8–10. Since the semi-esters mentioned above act as emulsifiers, it is generally superfluous to employ another emulsifier. If this is intended, however, the known emulsifiers, such as for example soaps or alkyl aryl sulphonates, can be used for this purpose. The activation of the polymerisation can be carried out with radical-forming substances, for example peroxides, potassium persulfate, and/or with redox systems, by which are to be understood the combinations of oxygen-yielding and reducing agents. Suitable reducing agents for this purpose are sulfinic acid, sugar, ascorbic acid, amines, salts of polyvalent metals and mercaptans. Furthermore, it is possible for the thermoplastic properties of the copolymers to be influenced according to known methods by adding regulators to the polymerization mixtures. Stabilizers, such as for example phenyl-β-naphthylamine, can be added to the mixture prior to working up.

The process of the invention can be carried out at a temperature of between 0 and 50° C., preferably at room temperature.

By using the polymer emulsions obtained in this manner, surface coatings are produced which are extraordinarily waterproof after drying and which also do not lose their bonding strength when they are exposed to the action of water or steam. Since their bonding power is surprisingly also good on metal surfaces, they are particularly suitable for the manufacture of coatings for packings. For example, sealing rings of preserve jars can be produced in a simple manner by means of these polymer emulsions. Owing to their good bonding power and excellent resistance to water, jars closed in such a manner can readily be subjected to a sterilising process.

Various additions, such as pigments, dyestuffs, casein and the like, can be made to the polymer emulsions, depending on the purpose for which they are to be used. Besides, polymerizing agents such as zinc oxide and sulfur, as well as vulcanization accelerators may be added.

The surface coatings produced by emulsion polymerization can be dried at room temperature and more rapidly at higher temperature, say up to 90° C.

The invention is further illustrated by the following examples without being restricted thereto, the parts given being by weight.

*Example 1*

50 parts of the acid ester of maleic acid and abietic alcohol are dissolved in 350 parts of acrylonitrile and stirred for 30 minutes at room temperature with 1800 parts of water, 150 parts of 1 N caustic soda solution, 1.2 parts of triethanolamine, 2.4 parts of dodecyl mercaptan and 550 parts of butadiene. 3.7 parts of potassium persulphate are thereafter added and the temperature adjusted to 25° C. The pH value during polymerization is to be 8 to 10. The polymerization is completed after about 12 hours. A homogeneous stable emulsion is formed, which after being spread, dries as a completely transparent film with good bonding strength.

*Example 2*

50 parts of the acid ester of maleic acid and abeitic alcohol are dissolved in 300 parts of styrene and 50 parts of acrylonitrile and stirred for 30 minutes at room temperature with 1800 parts of water, 150 parts of 1 N caustic soda solution, 1.2 parts of triethanolamine, 2.4 parts of dodecyl mercaptan and 550 parts of butadiene. 3.7 parts of potassium persulphate are thereafter added and the temperature adjusted to 25° C. The pH value during polymerization is to be 8 to 10. The polymerization is completed after about 24 hours. A homogeneous stable emulsion is formed, which dries as films with a good bonding strength.

*Example 3*

125 parts of the acid ester of maleic acid and dodecyl alcohol are dissolved in 688 parts of styrene and 125 parts of acrylonitrile. The solution is stirred for 30 minutes at room temperature in an autoclave with 2300 parts of water, 250 parts of 1 N caustic soda solution, 1.2 parts of triethanolamine and 437 parts of butadiene. 3.75 parts of potassium persulphate are then added and the temperature raised to 30° C. The pH value during the polymerization is maintained at 8 to 10. A homogeneous stable polymer emulsion is formed, which dry as firmly adhering coatings.

*Example 4*

16,500 parts of water, 1500 parts of 1-n-NaOH, 12 parts of triethanolamine and 24 parts of n-dodecyl mercaptan are placed in a 40 liter-stirring-autoclave and intensely stirred for 30 minutes with a solution of 600 parts of the semi-ester of maleic acid and hydroabietic alcohol in 2100 parts of acrylonitrile and 2100 parts of styrene, after addition of 7200 parts of butadiene. Thereupon 36 parts of potassium persulfate dissolved in little water are added and the temperature is adjusted to 25° C. Reaction is to be carried out at a pH of 8.5 to 9 and, if necessary, is to be adjusted. The emulsion is completely polymerized until it contains about 38 to 40 percent of copolymer, thereupon stabilized with 120 g. of 2,6-di-tert.-butyl-p-cresol and degasified.

An injection molding mass is prepared by homogeneously mixing (a) 333 parts of a polymer emulsion diluted so as to contain 30 percent of solid substance.

(b) 80 parts of kieselguhr, 10 parts of kaolin, 1 part of colloidal sulfur, 0.5 part of zinc oxide, 1 part of zinc diethyl dithiocarbamate, 1 part of a stabilizer prepared by polymerization of styrene in the presence of diphenylamine.

The fillers set forth under (b), before being added to the emulsion, are ground in a ball mill to form a dispersion with addition of 90 parts of an aqueous solution of a dispersing agent.

The final mixture is applied by means of a nozzle to the rim of a tin lid to form an about 1 mm. thick layer. This layer is dried at 80° C. An annular film is formed on the rim of the lid, which strongly adheres to the sheet iron. Upon folding the rim on to the tin, the film produces a tight sealing. By boiling the sealed tin in hot water, the film is vulcanized and is thus given a good stability to aging as well as a good resistance to oil and fat.

We claim:

1. A coating composition consisting of an aqueous dispersion of a copolymer obtained by copolymerizing in water at a pH value of 8 to 10, (1) 30–94% of a polymerizable ethylenically unsaturated monomer with an elasticizing action selected from the group consisting of acrylic and methacrylic acid esters of alcohols with at least 4 carbon atoms, conjugated diolefines of 4–6 carbon atoms, and vinyl alkyl ethers, the alkyl radicals of which contain at least 4 carbon atoms, (2) 70–5% of another monomer selected from the group consisting of styrene, divinyl benzene, acrylonitrile, an acrylic ester of a saturated alcohol of 1–3 carbon atoms, a methacrylic ester of a saturated alcohol of 1–3 carbon atoms, and 1,1-dichloroethylene and (3) an emulsifying agent consisting of 1–20 percent of the salt of a semi-ester of an $\alpha$-$\beta$-ethylene dicarboxylic acid and an alcohol selected from the group consisting of octyl, dodecyl, octadecyl, and abietyl alcohols.

2. Composition of claim 1 wherein said monomer (1) is butadiene, and said monomer (2) is acrylonitrile.

3. Composition of claim 1 wherein said monomer (1) is butadiene, and said monomer (2) is styrene.

4. Composition of claim 1 wherein said monomer (1) is butadiene, and said monomer (2) is a mixture of styrene and acrylonitrile.

5. The coating composition of claim 1 wherein said emulsifying agent (3) is a salt of a semi-ester of maleic acid and abietyl alcohol.

6. A copolymer of (1) 30–94% of a conjugated diolefin of 4 to 6 carbon atoms, (2) 70–5% of another monomer selected from the group consisting of styrene, divinyl benzene, acrylonitrile, acrylic and methacrylic esters of saturated alcohols of 1–3 carbon atoms, and 1,1-dichloroethylene, and (3) 1–20% of a salt of a semi-ester of an $\alpha$-$\beta$-ethylene dicarboxylic acid and an alcohol selected from the group consisting of octyl, dodecyl, octadecyl, and abietyl alcohols, the percentages being in parts by weight based on the total weight of monomer.

References Cited in the file of this patent
UNITED STATES PATENTS

| | | |
|---|---|---|
| 2,457,873 | D'Alelio | Jan. 4, 1949 |
| 2,537,016 | Barrett | Jan. 9, 1951 |
| 2,599,123 | Pinkney et al. | June 3, 1952 |